United States Patent [19]
Paret

[11] Patent Number: 5,892,795
[45] Date of Patent: *Apr. 6, 1999

[54] TELECOMMUNICATION SYSTEM AND MODEM FOR TRANSMISSION OF MODULATED INFORMATION SIGNALS OVER POWER SUPPLY LINES

[75] Inventor: Dominique Paret, Mendon, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 692,292

[22] Filed: Aug. 1, 1996

[30] Foreign Application Priority Data

Aug. 2, 1995 [FR] France ................................. 95 09419

[51] Int. Cl.$^6$ .................................................. H04M 11/00
[52] U.S. Cl. ...................... 375/222; 340/310.06; 455/3.3
[58] Field of Search ..................................... 375/344, 222, 375/219, 259, 268, 271, 285; 379/66; 340/310.01, 310.02, 310.03, 310.06, 310.04, 310.05, 310.07, 310.08; 455/3.3, 270

[56] References Cited

U.S. PATENT DOCUMENTS

| | | | |
|---|---|---|---|
| 4,149,258 | 4/1979 | Yahata et al. | 364/724 |
| 4,422,156 | 12/1983 | Sano | 364/724 |
| 4,510,611 | 4/1985 | Dougherty | 375/8 |
| 4,646,323 | 2/1987 | Meinzer | 375/259 |
| 4,815,106 | 3/1989 | Propp et al. | 375/257 |
| 5,198,796 | 3/1993 | Hessling, Jr. | 340/310.03 |
| 5,349,644 | 9/1994 | Massey et al. | 395/200 |
| 5,408,687 | 4/1995 | Ooga | 455/76 |

*Primary Examiner*—Chi H. Pham
*Assistant Examiner*—William Luther
*Attorney, Agent, or Firm*—Leroy Eason

[57] ABSTRACT

A telecommunication system for transmission along power supply lines of modulated information signals having a selected carrier frequency. The system includes a plurality of communication devices connected along the supply lines, each including a microcontroller and a modem. The modem includes an interface module which establishes a link to the power supply lines for modulated information signals, a transmission module which contains a digital modulator followed a digital/analog converter, and a receiving module. The receiving module includes a digital filter connected between an analog/digital converter and a digital demodulator. The digital filter is adapted to the carrier frequency of modulated information signals present on the power supply lines, whereby the modem can operate at any selected frequency over a broad frequency range.

10 Claims, 6 Drawing Sheets

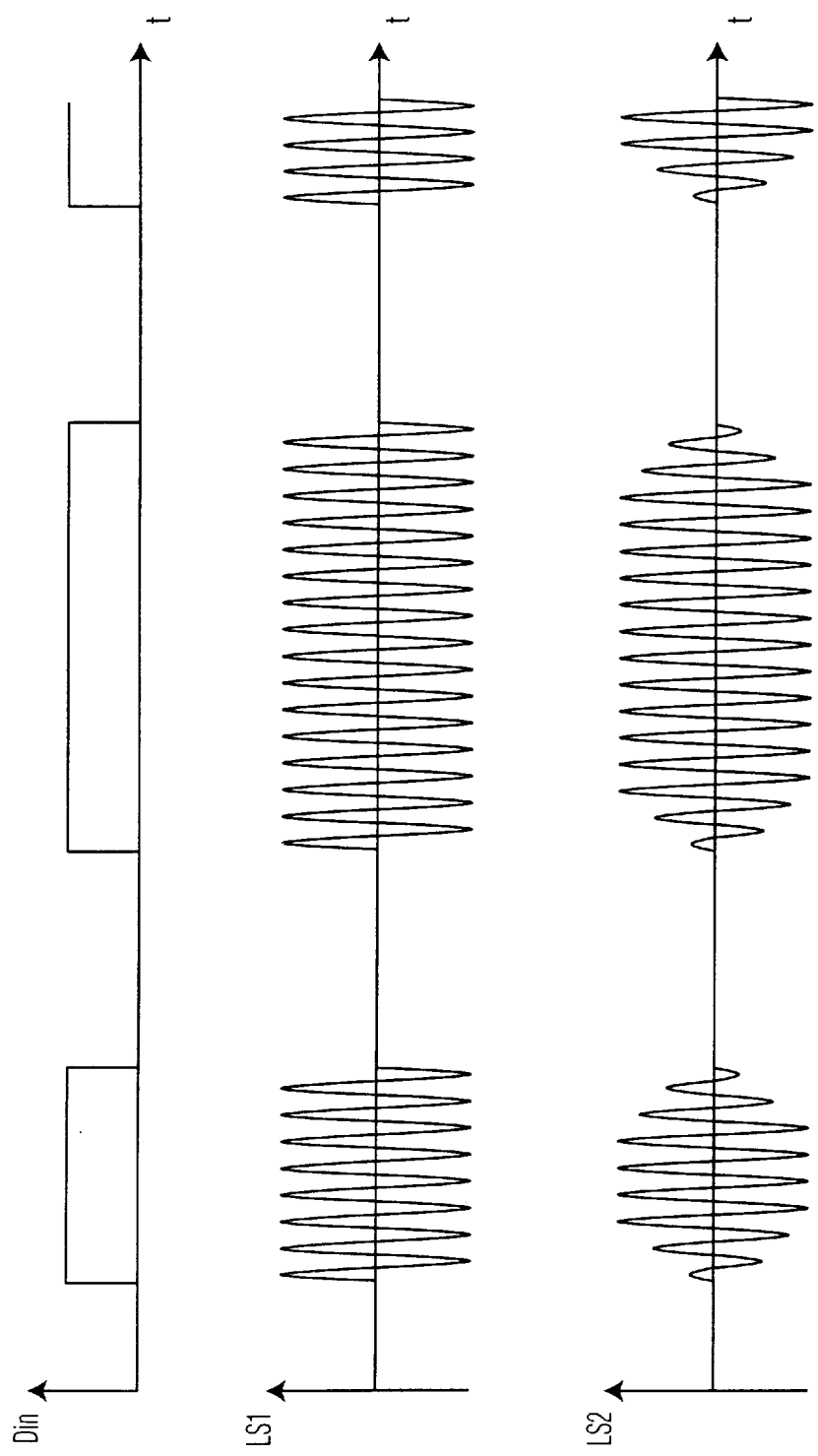

TELECOMMUNICATION SYSTEM AND MODEM FOR TRANSMISSION OF MODULATED INFORMATION SIGNALS OVER POWER SUPPLY LINES

BACKGROUND OF THE INVENTION

1. Field of the Invention

The present invention relates to a telecommunication system for transmission of information signals along power supply lines, the system comprising communication devices which each of include a microcontroller and a modem, said modem comprising an interface module which establishes a link to the power supply lines for information signals. The modem also comprises a transmission module which contains a digital modulator followed by a digital/analog converter whose output is connected to the interface module, the modem finally comprising a receiving module which contains an analog/digital converter whose input is connected to the interface module, followed by a digital demodulator.

2. Description of the Prior Art

A modem comprised in such a communication device is known from U.S. Pat. No. 4,510,611. Such known modem used for transmitting and receiving data on power supply lines comprises an interface module, a transmission module and a receiving module. The transmission module of such a device performs digital modulation of the transmit signal in the ASK mode (Amplitude Shift Keying), which consists of transmitting a fixed carrier signal at a nominal frequency when the signal to be modulated is a "1", and stopping the transmission when the signal to be modulated is a "0". The range of the authorized frequencies for this type of transmission runs from 60 to 140 Khz. The receiving module of such a device comprises an autocorrelator which checks the integrity of the received signal. This signal may have been jammed either by the presence of other information signals transmitted on the line, or by the turning on of powerful apparatus such as, for example, a washing machine, which causes a sudden variation of current in the power supply lines. If the integrity of the signal is questioned by the autocorrelator, an information signal is sent to a microcontroller which controls the modem, which microcontroller has the task of sending a signal through the modem's transmission module to the device that has initially transmitted the signal of doubtful integrity in order to request a retransmission, and this is done until the signal reaches the modem unaffected. However, this procedure lacks flexibility and may cause considerable delays in communications, particularly in the case where parasitic or, in terms of electromagnetic noise, polluting phenomena are lasting and/or frequent.

SUMMARY OF THE INVENTION

It is an object of the present invention to overcome this disadvantage by providing a telecommunication system along power supply lines, which system is less sensitive to parasitic phenomena and, is when a communication frequency is too polluted, capable of adapting itself to another, more adequate frequency.

According to the present invention, a telecommunication system along power supply lines of the type defined in the opening paragraph is characterized in that the receiving module which is present in the modem included in each of the communication devices, further contains a digital filter arranged between the analog/digital converter and the digital demodulator, said digital filter comprising means enabling it to adapt itself to the frequency of modulated information signals present on the power supply lines.

The digital filter largely eliminates parasitic signals which could alter the received signal, thus making the modem of each of the communication devices less sensitive to electromagnetic noise. Furthermore, the digital filter maintains its properties if the communication frequency is changed. The telecommunication system is thus no longer confined to operating at a fixed nominal frequency and is capable of leaving a polluted communication frequency to change to another, more adequate frequency.

In a particularly advantageous embodiment of the invention, a telecommunication system as described above is characterized in that, within the modem included in each communication device, the digital filter, as well as the digital modulator, the digital/analog converter and the analog/digital converter are all timed with the same common clock signal.

Since the clock signal is shared by all the parts of the modem of each of the communication devices which need to be clocked, the adaptation of the digital filter to the frequency of the received signal is achieved in a perfectly automatic manner.

A variant of the invention presents a telecommunication system as described above, characterized in that the modem included in each of the communication devices comprises a ROM in which is stored in sampled form a carrier signal used for the modulation, the reading of the ROM being timed with the common clock signal.

The microcontroller of the receiving communication device thus only needs to control the clock signal, the adaptation of the frequency of the carrier signal to the new selected frequency being automatically within the very modem it controls.

Another variant of the invention presents a telecommunication system, characterized in that the carrier signal stored in sampled form in the ROM comprised in the modem included in each of the communication devices has values which are subjected to two transitory regimes. During the first regime, at the beginning of the transmission, the carrier signal amplitude that progressively rises up to a fixed nominal value. During the second regime, at the end of the transmission, the amplitude of the carrier signal progressively drops to zero.

The progressive rise and fall of the amplitude during switching of transmission generate less noise on the power supply lines. The telecommunication system according to this variant of the invention is thus rendered less polluting for the other information signals which could be present on said lines.

According to an advantageous embodiment of the variants of the invention described above, a telecommunication system according to the invention is characterized in that the digital filter present in the modem included in each of the communication devices comprises a further ROM in which various sets of coefficients that correspond to various filter patterns are stored, said further ROM being addressed by the microcontroller via a control bus.

This variant of the invention enables the telecommunication system to adapt itself to since type of interference encountered. Indeed, the electromagnetic noise is largely dependent on the environment in which the system is located, it may take diverse forms. A filter which has preprogrammed and selectable sets of multiple coefficients ensures an optimum behavior of the filter in the various cases that have been foreseen in the study of the configuration of the filter.

The invention likewise relates to a modem comprising an interface module, which establishes connection between the modem and power supply lines for information signals such modem also comprises a transmission module which contains a digital modulator followed by a digital/analog converter whose output is connected to the interface module. The modem finally comprises a receiving module which contains an analog/digital converter whose input is connected to the interface module, followed by a digital demodulator, characterized in that the receiving module further contains a digital filter arranged between the analog/ digital converter and the digital demodulator, said digital filter comprising means enabling it to adapt itself to the frequency of signals present on the power supply lines.

In a particularly advantageous embodiment, such a modem is characterized in that the digital filter as well as the digital modulator, the digital/analog converter and the analog/digital converter are all timed with the same clock signal.

A variant of such a modem is characterized in that a carrier signal used for the modulation is stored in sampled form in a ROM of which the reading is timed with the common clock signal.

Another variant of such a modem is characterized in that the carrier signal stored in sampled form in the ROM has amplitude values which are subject to two transitory regimes. During the first regime, at the beginning of transmission, the carrier signal has an amplitude which progressively rises up to a fixed nominal value. During the second regime, at the end of transmission, during which the amplitude of the carrier signal progressively drops to zero.

Finally, an advantageous form of a modem according to one of the variants described above is characterized in that the digital filter it comprises accommodates another ROM in which various sets of coefficients that correspond to different filter patterns are stored.

These and other aspects of the invention will be apparent from and elucidated with reference to the embodiments described hereinafter.

BRIEF DESCRIPTION OF THE DRAWINGS

For a fuller understanding of the invention, reference is had to the following description taken in connection with the following drawings, in which:

FIG. 6 is a set of timing diagrams illustrating in two cases that correspond to two different embodiments of the invention the development of the output signal of a modem as a function of the signal to be modulated, produced by the microcontroller which controls this modem.

DETAILED DESCRIPTION OF THE PREFERRED EMBODIMENTS

Figure 1:
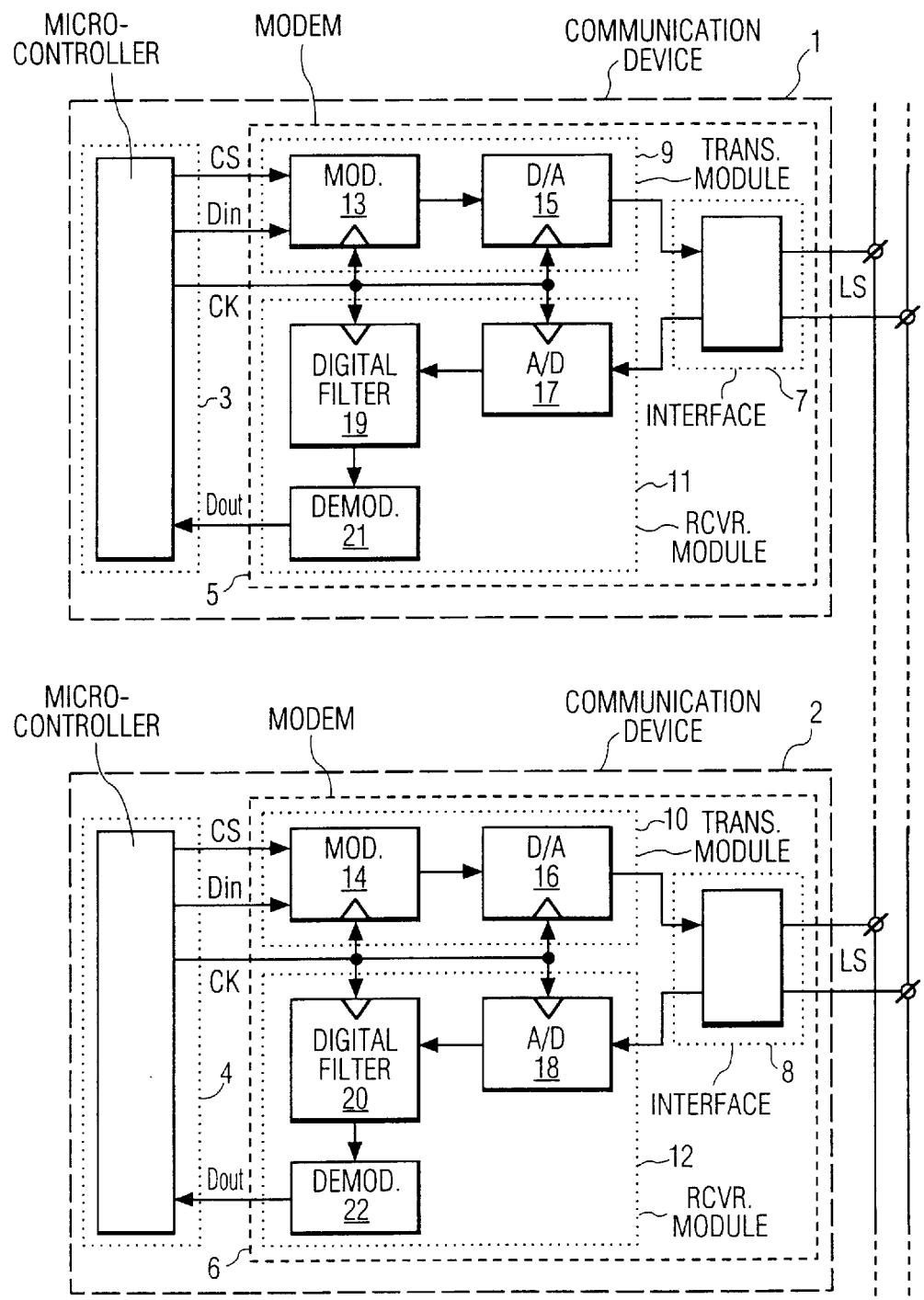
FIG. 1 is an operational diagram describing an example of a telecommunication system along power supply lines according to the invention.

FIG. 1 shows a partial operational diagram of a telecommunication system along for transmission of information signals power supply lines according to the invention. Such a telecommunication system comprises two communication devices (1, 2), each of them including a microcontroller (3, 4) and a modem (5,6); The modem comprise an interface module (7, 8) which establishes the link between the modem and the power supply lines for information signals, said modem also comprising a transmission module (9, 10) which contains a digital modulator (13, 14) followed by a digital/analog converter (15, 16) whose output is connected to the interface module (7, 8), said modem finally including a receiving module (11, 12) containing an analog/digital converter (17, 18) whose input is connected to the interface module (7, 8), followed by a digital demodulator (21, 22). The receiving module present in each modem included in each of the communication devices further contains a digital filter (19, 20) arranged between the analog-to-digital converter (17, 18) and the digital demodulator (21, 22). The digital filter, as well as the digital modulator, the digital/ analog converter and the analog/digital converter are all timed with the same common clock signal CK.

Each modem (5, 6) is controlled by its associated microcontroller (3, 4) which produces a digital input demodulation signal CS Din, a sampled carrier signal used for the digital modulation, and the common clock signal CK. The microcontroller receives from the modem a signal Dout, which is a digital signal that has been transmitted in modulated form by the microcontroller itself or by the other communication device over power supply lines, while the corresponding analog signal is LS.

A signal is transmitted by a communication device (1, 2) in the following manner: the transmission module (9, 10) performs the digital modulation of the signal to be transmitted Din produced by the microcontroller (3, 4) in the ASK mode (Amplitude Shift Keying), which consists of transmitting a fixed carrier signal at a nominal frequency when the signal to be modulated is a "1" and of stopping the transmission when the signal to be modulated is "0". The frequency range authorized for this type of transmission runs from 60 to 140 kHz. The carrier signal CS is supplied by the microcontroller (3, 4) to the digital modulator (13, 14) whose output signal is converted into an analog signal by the digital/analog converter (15, 16). The output signal of this converter is transmitted over the power supply lines via the interface module (7, 8). The evolution of the signal LS1, which is then present on the output terminals of the interface module (7, 8), as a function of the input signal to be modulated Din can be observed in FIG. 6 where the ratio between the frequencies of these two signals has been chosen in arbitrary manner so as to give a representation permitting easy comprehension.

A signal present on the power supply lines is received by a communication device (1, 2) in the following manner: the received signal LS is transmitted to the analog/digital converter (17, 18) contained in the receiving module (11, 12) via the interface module (7, 8). The output signal of the analog/ digital converter (17, 18) is filtered in the digital filter (19, 20), which makes it possible to largely remove the parasitic signals that could have affected it. The filtered signal is then demodulated in the digital demodulator (21, 22) whose output Dout is transmitted to the microcontroller (3, 4). If the microcontroller proves to be incapable of utilizing the signal Dout, it can cause a change of the communication frequency by modifying the frequency of the common clock signal CK as well as that of the carrier signal CS.

The modem (5, 6) makes it possible to check the integrity of the modulation. Indeed, when a communication device (1, 2) transmits a signal LS, it is possible for this communication device to simultaneously process this signal as a received signal, as described above. The microcontroller (3, 4) compares the two signals Din and Dout which must, in principle, be identical.

Figure 2:
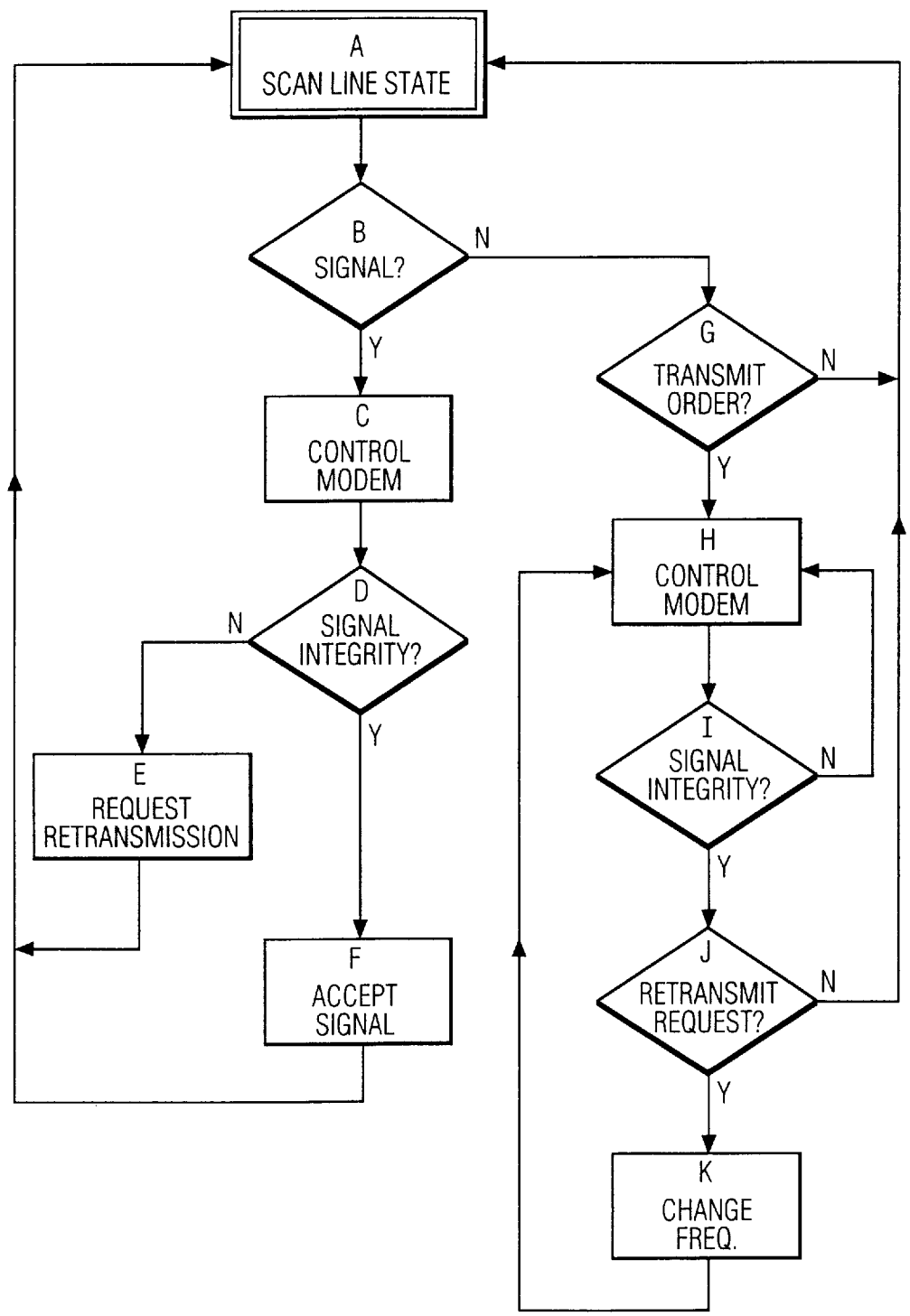
FIG. 2 is a flow chart illustrating the behavior of a microcontroller which controls a modem inside a communication device.

FIG. 2 shows a flow chart illustrating a possible mode of operation of a microcontroller which controls a modem located in a communication device: step A represents the first step of the microcontroller, during which it constantly scans the state of the power supply lines by the bias of the modem it controls. Step B has for its aim to detect a signal on these lines. If a signal is detected, the microcontroller changes to step C where it identifies the frequency of the detected signal, then commands the modem to effect the analog/digital conversion, the digital filtering and the digital demodulation of the signal present on the lines. Step D is an integrity test of the received signal. If the signal is considered unusable, the microcontroller changes to step E in which it transmits over the lines a signal that calls for the retransmission of the received signal at a more hospitable frequency, at the end of which it goes back to the initial step A of the scanning of the lines. If the signal is considered usable at the end of test D, the microcontroller changes to step F in which it effectively uses the received signal, before returning to the first step A of the scanning of the lines.

If no signal at all is detected on the power supply lines, the transmission of a signal is possible. Test G determines whether the microcontroller has received an order to transmit. If it has not, the microcontroller returns to the first step A of the scanning of the lines. If it has, it goes to step H in which it commands the modem to digitally modulate the transmit signal, convert the resulting signal from digital to analog form and transmit the resulting signal. The test I makes it possible to check the integrity of the transmitted signal by processing it as a received signal as indicated in the description of step C. If the transmitted signal is considered non-valid, the microcontroller returns to step H to proceed to the retransmission of the signal at the same frequency. If the transmitted signal is valid, the microcontroller performs the test J in which it scans the lines to detect any request for retransmission at a more hospitable frequency. If there is no such frequency, the microcontroller goes to the first step A of the scanning of the lines. If a request for a retransmission at a different frequency arrives, the microcontroller moves to step K in which it changes the frequency in the communication device and then goes back to step H in which it commands a retransmission at the new frequency. The process is repeated until the microcontroller no longer receives requests to change the transmitting frequency, which makes it then possible for the microcontroller to go back to the first step A of the scanning of the lines.

Figure 3:
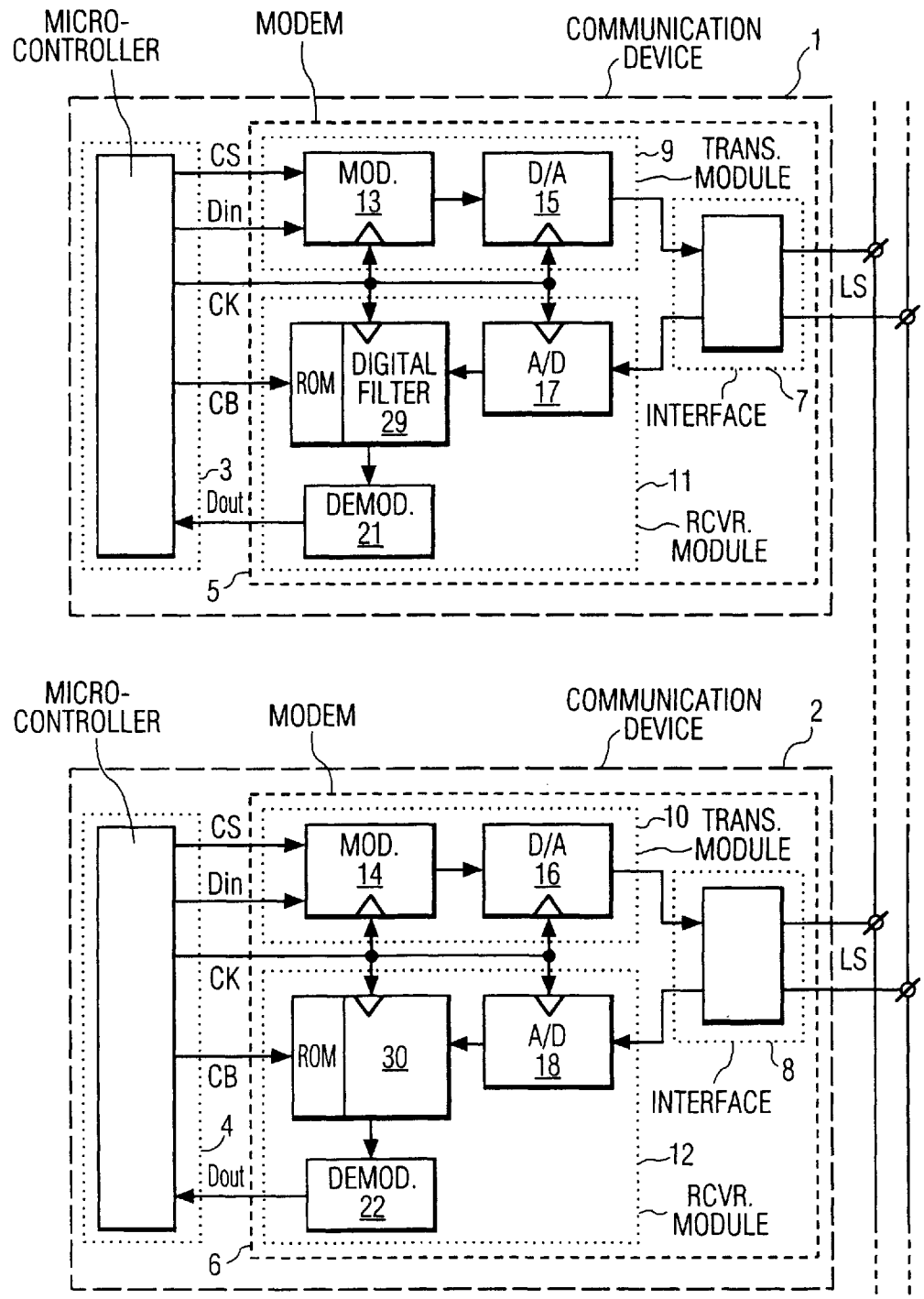
FIG. 3 is another operational diagram describing an advantageous embodiment of a telecommunication system along power supply lines, according to the invention.

FIG. 3 shows a partial operational diagram of an advantageous embodiment of a telecommunication system according to the invention, in which the digital filter (29, 30) present in each of the modems (5, 6) included in each of the communication devices (100, 200) comprises a ROM in which various sets of coefficients that correspond to various filter patterns are stored, said ROM being addressed by the microcontroller (3, 4) via a control bus CB.

Figure 4:
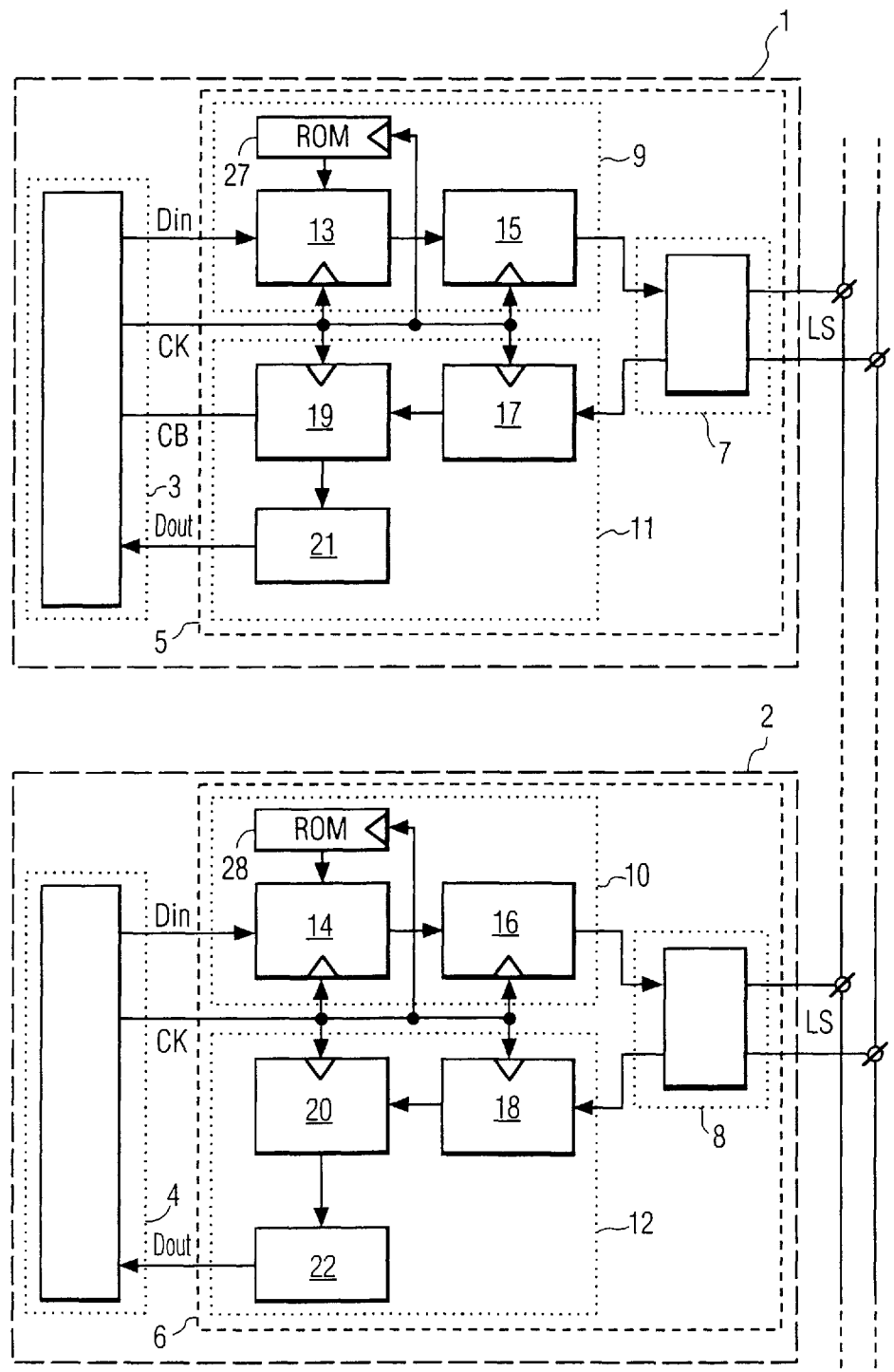
FIG. 4 is another operational diagram describing an example of a telecommunication system along power supply lines, according to a variant of the invention.

FIG. 4 shows a partial operational diagram of a telecommunication system according to a variant of the invention, in which each of the communication devices (1, 2) comprises a modem (5, 6) in which a carrier signal used for the modulation is stored in sampled form in a ROM (27, 28) of which the reading is timed with the common clock signal CK. The rest of the modem remains unchanged and functions as described above. It is sufficient for the microcontroller controlling such a modem to modify the frequency of the common clock signal to obtain a modification of the transmitting frequency. The signal transmitted by the transmitting module (9, 10) via the interface module (7, 8) is identical with the signal LS1 represented in FIG. 6, if the signal that is sampled and stored in the ROM (27, 28) is identical with the signal CS produced by the microcontroller in the preceding case.

According to another variant of a telecommunication system according to the invention, the carrier signal stored in sampled form in the ROM (27, 28) comprised in the modem (5, 6) included in each of the communication devices (1, 2) has values that are subjected to two transitory regimes. A first regime, at the beginning of transmission, during which the carrier signal has an amplitude that progressively rises up to a nominal fixed value, and a second regime at the end of transmission, during which the amplitude of the carrier signal progressively drops to zero.

The evolution of the signal LS2 transmitted by the transmitting module (9, 10), which accommodates a ROM (27, 28) that contains such a carrier signal, via the interface module (7, 8) over the power supply lines may be observed in FIG. 6. The progressive rise and fall of the amplitude during the switching generate less noise on the power supply lines. The modem according to this variant of the invention is less polluting for the other information signals which could be present on the same lines.

Figure 5:
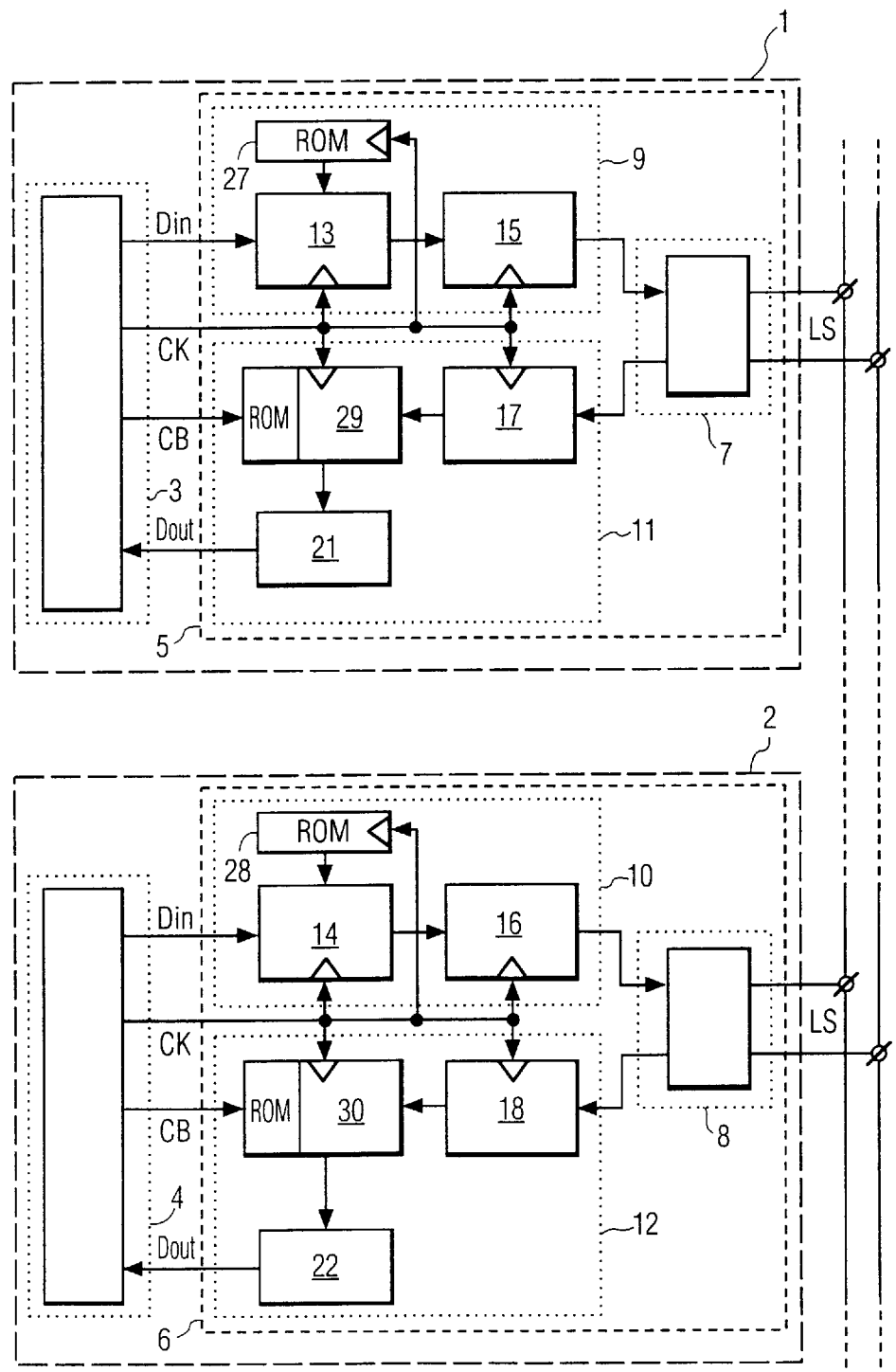
FIG. 5 is another operational diagram describing an advantageous embodiment of a telecommunication system along power supply lines, according to a variant of the invention.

FIG. 5 shows a partial operational diagram of an advantageous embodiment of a telecommunication system according to either of the two variants of the invention described above, in which the digital filter (29, 30) present in each modem included in each of the communication devices (1, 2) comprises a ROM in which various sets of coefficients that correspond to various filter patterns are stored, said ROM being addressed by the microcontroller (3, 4) via a control bus CB.

What is claimed is:

1. A telecommunication system comprising a plurality of communication devices which communicate by transmission of information signals along power supply lines commonly connected thereto, the information signals being in the form of digitally modulated carrier signals, each of said communication devices including a microcontroller and a modem; each of said modems comprising:

an interface module which establishes a link to the power supply lines for transmission and reception of information signals;

a transmission module which includes a digital modulator followed by a digital/analog converter having an output connected to the interface module, the digital modulator being controlled by said microcontroller to modulate a carrier signal having a frequency selected by said microcontroller; and a receiving module which includes an analog/digital converter having an input connected to the interface module and an output which is followed by a digital demodulator;

characterized in that the receiving module further includes a digital filter connected between the output of the analog/digital converter and an input of the digital demodulator, said digital filter being timed by a clock signal supplied by said microcontroller corresponding to the frequency of an information signal received by the interface module from the power supply lines.

2. A telecommunication system as claimed in claim 1, wherein the clock signal supplied to the digital filter is a common clock signal supplied by the microcontroller for also timing the digital modulator, the digital/analog converter and the analog/digital converter.

3. A telecommunication system as claimed in claim 2, wherein the modem further comprises a ROM for storing in sampled form a carrier signal for use by the digital modulator in forming an information signal, read out of the ROM being timed by said common clock signal.

4. A telecommunication system as claimed in claim 3, wherein the carrier signal stored in sampled form in the ROM has an amplitude in accordance with two transitory ranges, a first range at the beginning of a transmission and during which the carrier signal amplitude progressively rises up to a fixed nominal value, and a second range at the end of a transmission and during which the carrier signal amplitude progressively drops to zero.

5. A telecommunication system as claimed in claim 3, wherein the digital filter comprises a further ROM for storing various sets of coefficients corresponding to various filter patterns, said further ROM being addressable by the microcontroller.

6. A modem for inclusion in a communication device for use in a telecommunication system wherein communication with said device is by transmission of information signals along power supply lines coupled thereto, the information signals being in the form of digitally modulated carrier signals; said modem comprising:

an interface module which establishes a link to the power supply lines for transmission and reception of information signals;

a transmission module which includes a digital modulator followed by a digital/analog converter having an output connected to the interface module, the digital modulator being controlled by said microcontroller to modulate a carrier signal having a frequency selected by said microcontroller; and a receiving module which includes an analog/digital converter having an input connected to the interface module and an output which is followed by a digital demodulator;

characterized in that the receiving module further includes a digital filter connected between the output of the analog/digital converter and an input of the digital demodulator, said digital filter being timed by a clock signal corresponding to the frequency of an information signal received by the interface module from the power supply lines.

7. A modem as claimed in claim 6, wherein the clock signal for timing the digital filter is a common clock signal for also timing the digital modulator, the digital/analog converter and the analog/digital converter.

8. A modem as claimed in claim 7, wherein said modem further comprises a ROM for storing in sampled form a carrier signal for use by the digital modulator to forming an information signal, read out of the ROM being timed by said common clock signal.

9. A modem as claimed in claim 8, wherein the carrier signal stored in sample form in the ROM has an amplitude in accordance with two transitory ranges, a first range at the beginning of a transmission and during which the carrier signal has an amplitude which progressively rises up to a fixed nominal value, and a second range at the end of a transmission and during which the carrier signal amplitude progressively drops to zero.

10. A modem as claimed in claim 9, wherein the digital filter comprises a further ROM for storing various sets of coefficients corresponding to various filter patterns.

* * * * *